United States Patent [19]

Morita

[11] Patent Number: 5,605,227

[45] Date of Patent: Feb. 25, 1997

[54] CASE FOR RECORDING MEDIUM

[75] Inventor: Kiyoo Morita, Kanagawa, Japan

[73] Assignee: Fuji Photo Film Co., Ltd., Kanagawa, Japan

[21] Appl. No.: 527,713

[22] Filed: Sep. 13, 1995

[30] Foreign Application Priority Data

Oct. 6, 1994 [JP] Japan .................... 6-266111

[51] Int. Cl.⁶ .................... B65D 85/672
[52] U.S. Cl. .................... 206/387.1; 206/307; 206/474; 220/326
[58] Field of Search ................ 206/307, 387.1, 206/387.11–387.15, 232, 472, 474; 220/326, 306

[56] References Cited

U.S. PATENT DOCUMENTS

| | | | |
|---|---|---|---|
| 4,771,886 | 9/1988 | Johnson | 206/387 |
| 5,037,000 | 8/1991 | Selame | 221/303 |
| 5,351,823 | 10/1994 | Kollinek | 206/387 |

*Primary Examiner*—Bryon P. Gehman
*Assistant Examiner*—Luan K. Bui
*Attorney, Agent, or Firm*—Sughrue, Mion, Zinn, Macpeak & Seas

[57] ABSTRACT

A case for a recording medium which provides superior handling in inserting and taking out a recording medium, and further prevents entrance of dust into the case. A case of the invention for encasing, for example, a video cassette includes a case body and a closure member which are connected to each other through a connection member in such a manner that the case is foldable. On the bottom surface of the case body is formed a frame defining a space into which a cassette is to be stored. On an upper surface of the closure is formed a peripheral wall structure which covers or overlaps with an external surface of the frame when the case is closed. An upper edge and opposite ends of the peripheral wall structure are formed with a projection, whereas an internal surface of the case is formed with grooves into which the above groove is to be fit. The peripheral wall structure is formed at an internal surface thereof with convex ribs disposed closer to the upper edge, whereas the frame is formed at an external surface thereof with grooves in the vicinity of the above groove.

9 Claims, 10 Drawing Sheets

CASE FOR RECORDING MEDIUM

BACKGROUND OF THE INVENTION

The present invention relates to a case for encasing a data recording medium such as a magnetic tape cassette. More particularly, the invention relates to such a case having a dustproofing structure for preventing dust and/or foreign matter from entering the case.

Conventionally, when a data recording medium such as a magnetic tape cassette is to be stored, the data recording medium is inserted in a suitable case in order to prevent foreign matter such as dust from adhering to the recording surface of the recording medium, and also to protect the cassette from damage. One example of such a case includes a closure member and a case body connected to each other through a thin hinge structure arranged such that the closure member faces the case body, whereby the closure member and the case body are able to open or close relative to each other. A frame and a peripheral wall structure are formed on opposing surfaces of the case body and the closure member at peripheral edges thereof. The frame and peripheral wall structure, which overlap with each, cooperate to define a space in which a cassette is to be stored. An engagement structure including a projection and a recess engageable with each other is provided at an overlapping area of the frame and the peripheral wall structure, thereby making it possible to keep the closure member and the case body closed relative to each other.

Figure 1:
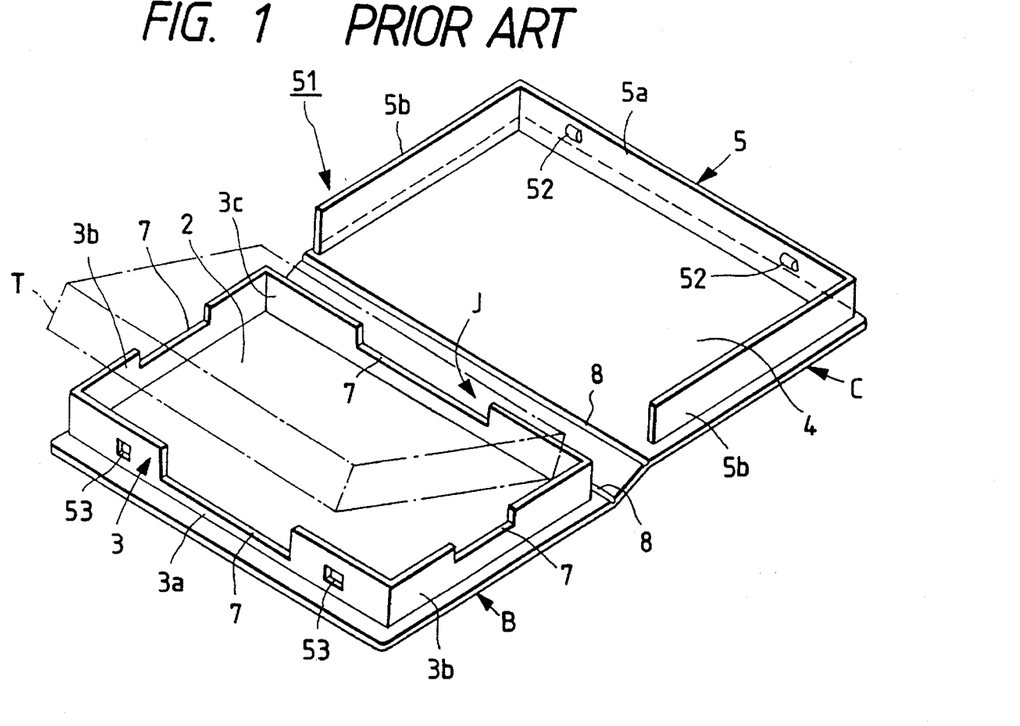
FIG. 1 is a perspective view illustrating an example of a conventional case for a recording medium.

FIG. 1 illustrates an example of a conventional case for encasing a video cassette therein. The case 51 has a case body B and a closure member C connected to each other through a connection member J so that the case is foldable. The case body B, the closure member C and the connection member J are integrally formed of a flexible material such as synthetic resin. The case body B and the closure member C are foldable relative to each other due to a pair of thin-walled hinges 8 formed in the connection member J. In the closed position the bottom surface of the case body B faces the upper surface of the closure member C.

A rectangular frame 3 is formed on the bottom surface of a bottom plate 2 of the case body B at the peripheral edge thereof defining a space corresponding to the shape of the cassette. On the other hand, on the upper surface of an upper plate 4 of the closure member C is formed a U-shaped peripheral wall structure 5 along the front edge and left and right edges of the upper plate 4. The peripheral wall structure 5 covers or overlaps with the external surface of the frame 3 when the case is closed.

When a magnetic tape cassette T is to be encased in the case, the case 51 is opened, as illustrated in FIG. 1. Then, the magnetic tape cassette T is inserted into the case body B, and subsequently the closure member C is closed. In inserting the magnetic tape cassette T into the case body B, the magnetic tape cassette T is pressed at side surfaces thereof to thereby adjust the position of the cassette T with respect to the front, rear, left and right walls of the frame 3 defining the space in which the cassette is to be stored. Thus, it is preferable for the space for storing the cassette not to have a large gap between the frame and the cassette.

A front wall 5a, which is a part of the peripheral wall structure 5 and is disposed at the front edge of the closure member C, may be formed with projections 52, whereas a front wall 3a, which is a part of the frame 3 and corresponds to the front wall 5a of the peripheral wall structure 5, may be formed with recesses 53. By engaging the projections 52 with the recesses 53, undesired opening of the case 51 is prevented.

The frame 3 is formed at upper edges of its four walls with cut-outs 7 for ease of inserting and taking out the magnetic tape cassette T.

When the case body B and the closure member C are closed with the magnetic tape cassette T encased therein, internal surfaces of the front wall 5a and side walls 5b of the peripheral wall structure 5 overlap with external surfaces of the front wall 3a, disposed at an opening and closing distal end, and side walls 3b of the frame 3 and an internal surface of the connection member J overlap with an external surface of a rear wall 3c disposed closer to the connection member J. When the magnetic tape cassette T is to be taken out of the case, the user places his or her fingers at both edges of the bottom plate 2 and the upper plate 4, and then opens the case body B and the closure member C in the manner of a book.

Figure 2:
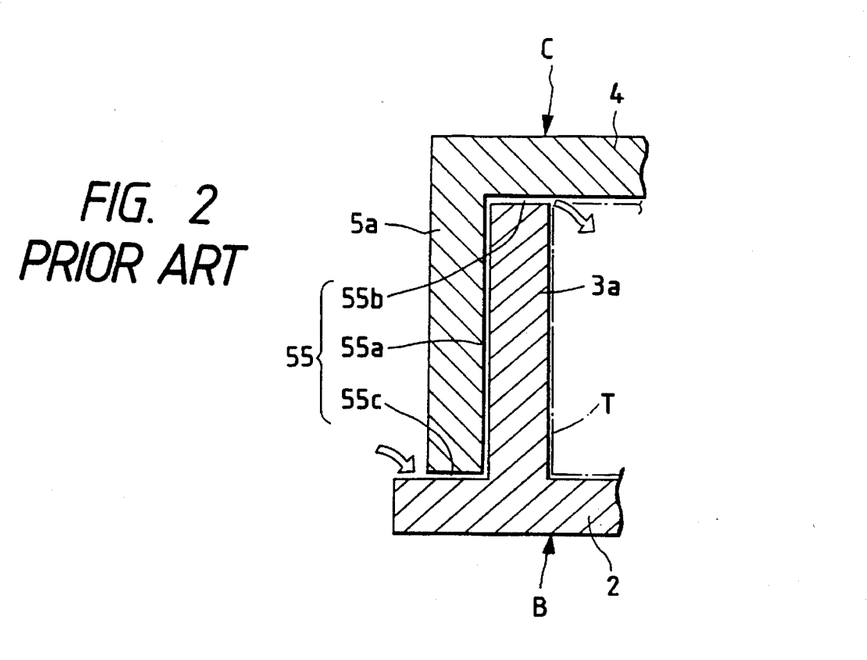
FIG. 2 is an enlarged view illustrating the closed condition of the conventional case illustrated in FIG. 1.

In the "single swing" case 51 described above, there arises a problem in that the opening and closing operation is quite difficult when the magnetic tape cassette T is to be inserted or removed if the gap between the external surface of the frame 3 and the internal surface of the peripheral wall structure 5 is too small to the extent that the external surface of the frame 3 and the internal surface of the peripheral wall structure 5 are strongly rubbed against each other. Thus, as illustrated in FIG. 2, an appropriate gap 55a has to be provided between the external surface of the frame 3 and the internal surface of the peripheral wall structure 5 even when the case body B and the closure member C are closed relative to each other. In addition, even when the case body B and the closure member C are closed relative to each other by means of the projections 52 and the recesses 53, in order to compensate for variations in manufacturing accuracy there are unavoidably produced gaps 55b and 55c between the upper edge of the frame 3 and the upper surface of the upper plate 4, as well as between the front edge of the peripheral wall structure 5 and the bottom surface of the bottom plate 2.

However, if there is a gap 55 between the frame 3 and the peripheral wall structure 5, even when the case body B and the closure member C are closed relative to each other, foreign matter such as dust can still enter the case through a path indicated by arrows in FIG. 2. In particular, recently recording of data on a recording medium in digital form has become more common. Foreign matter adhering to the recording surface of such a recording medium may cause signal drop-out, and hence exert a more harmful effect on the reproduction of the digitally recorded data than in the case where the signal is recorded in analog form.

SUMMARY OF THE INVENTION

It is therefore an object of the present invention to overcome the above mentioned problems of the prior art. More specifically, it is an object of the invention to provide a case for a recording medium which provides superior handling for inserting and taking out the recording medium, and further prevents entrance of dust into the case.

The above-mentioned as well as other objects of the invention Can be accomplished by a case for a recording medium, the case comprising a case body connected to a closure member through a connection member so that the case body and the closure member are able to open or close relative to each other, the case body having formed on a bottom surface thereof a frame defining a space in which a cassette is to be stored, the closure member having formed on an upper surface thereof a peripheral wall structure which overlaps over the frame at the external surface of the frame when the case is closed, the case being characterized by the provision of fitting means for supplementarily fitting to each other, disposed between an edge of the peripheral wall structure and the internal surface of the case facing to the edge of the peripheral wall structure, and engaging means, disposed in the vicinity of the fitting means, for engaging the case body to the closure member so that the case body is kept closed relative to the closure member.

The engaging means is preferably constructed by forming at least a part of the fitting means as a press-fitting section.

The fitting means preferably has a groove formed on one of the bottom surface of the case body and the edge of the peripheral wall structure, and a projection formed on the other and adapted to be fit into the groove.

In accordance with the case for a recording medium having an above mentioned structure, the edge of the peripheral wall structure is supplementarily fit into the internal surface of the case to thereby prevent foreign matter such as dust from entering the case while the case is closed. Thus, the peripheral wall structure and frame can be structured so that a gap can be formed between the internal surface of the peripheral wall structure and the external surface of the frame when they overlap each other.

In addition, since the engaging means engages the peripheral wall structure on which the fitting means is formed in the vicinity of the distal edge thereof, even if the peripheral wall structure has some waviness along the edges produced during molding, the fitting of the closure member to the case body nevertheless can be surely maintained by the engagement force exerted by the engaging means.

DESCRIPTION OF THE PREFERRED EMBODIMENTS

With reference to the attached drawings, a case for a recording medium constructed in accordance with a first preferred embodiment of the present invention will now be described in detail.

Figure 3:
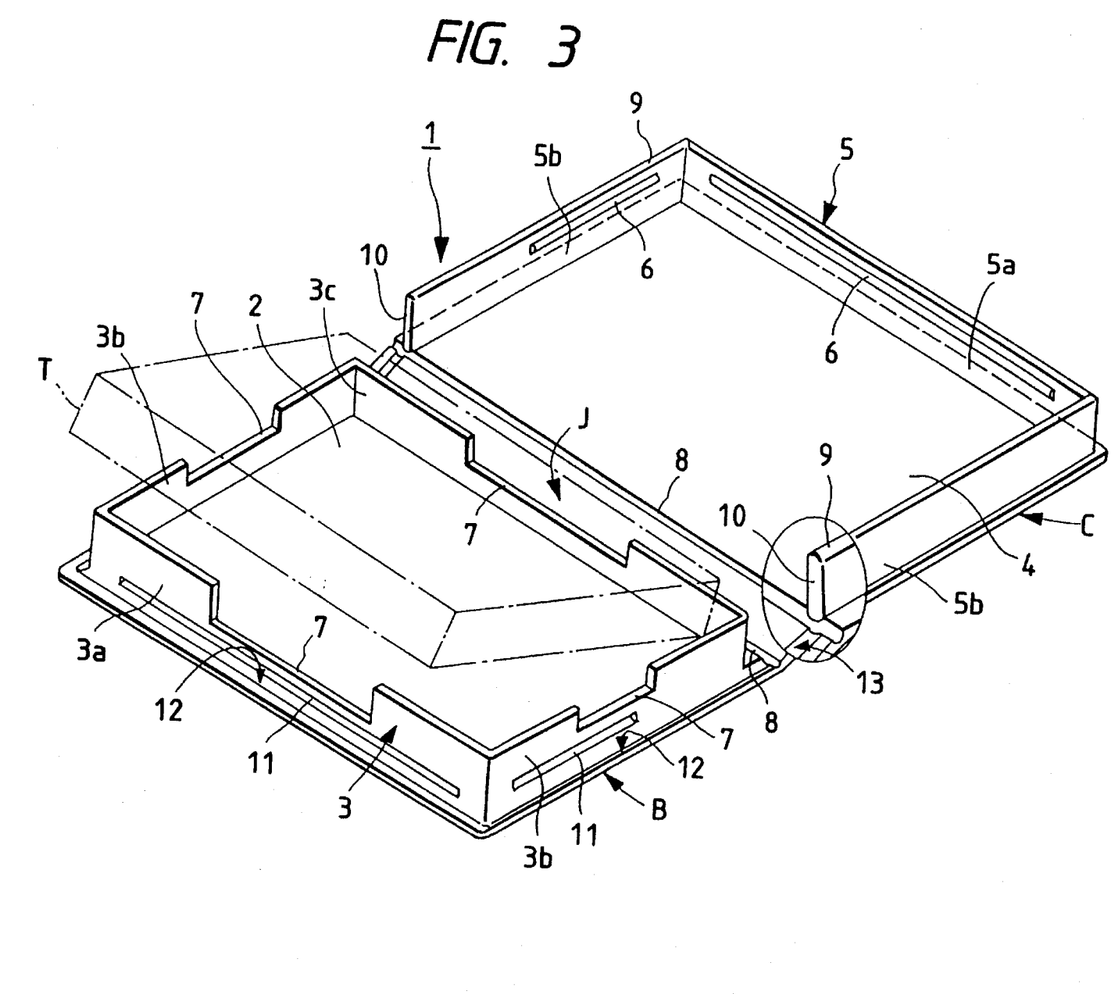
FIG. 3 is a perspective view, including a partially enlarged view, illustrating a case for a recording medium constructed in accordance with a preferred embodiment of the present invention.

FIG. 3 is a perspective view, including a partially enlarged view, illustrating a case 1 for encasing a video cassette therein, which case is constructed in accordance with a first preferred embodiment of the invention.

The case 1 includes a case body B and a closure member C which are connected to each other through a connection member J in such a manner that the case is foldable. The case body B, the closure member C and the connection member J are integrally formed of a material such as a thermoplastic synthetic resin. The case body B and the closure member C are foldable relative to each other due to a pair of thin-walled hinges 8 formed in the connection member J. The bottom surface of the case body B faces the ripper surface of the closure member C when the case is closed.

On a bottom surface of a bottom plate 2 of the case body B there is formed at the peripheral edge a rectangular frame 3 defining a space corresponding to the shape of the cassette to be stored therein. On the other hand, on an upper surface of an upper plate 4 of the closure member C is formed a U-shaped peripheral wall structure 5 at a front edge and left and right edges of the upper plate 4. The peripheral wall structure 5 covers or overlaps with the external surface of the frame 3 when the case is closed.

Thus, when the case body B and the closure member C are closed to each other with the magnetic tape cassette T inserted therein, internal surfaces of the front wall 5a and side walls 5b of the peripheral wall structure 5 overlap with external surfaces of the front wall 3a disposed at the opening and closing distal end, and side walls 3b of the frame 3 and the internal surface of the connection member J overlap with an external surface of a rear wall 3c disposed closer to the connection member J.

Figure 4:
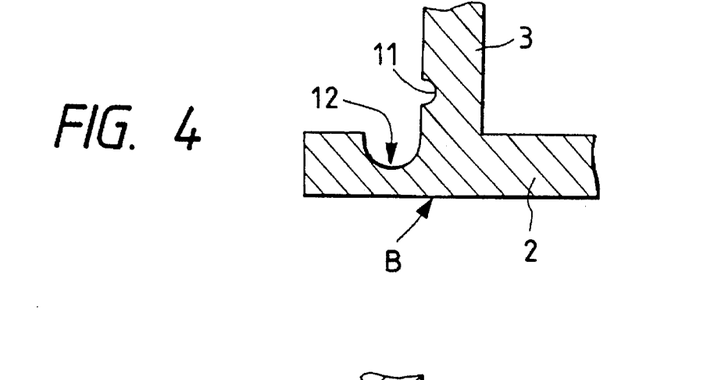
FIG. 4 is an enlarged view of a groove formed on the bottom surface of the case illustrated in FIG. 3.

As illustrated in FIGS. 3 and 4, outside the front wall 3a and side walls 3b of the frame 3 and at a location which faces an upper edge 9 of the peripheral wall structure 5 on the bottom surface of the bottom plate 2 there is continuously formed a groove 12 having a semicircular cross-section. The groove 12 is formed in the bottom plate along the external surfaces of the front wall 3a and the side walls 3b. In addition, as illustrated in FIG. 7, a groove 13 having a semicircular cross-section is formed on the connection member J at the internal surface thereof which opposite ends 10 of the peripheral wall structure 5 face.

Figure 5:
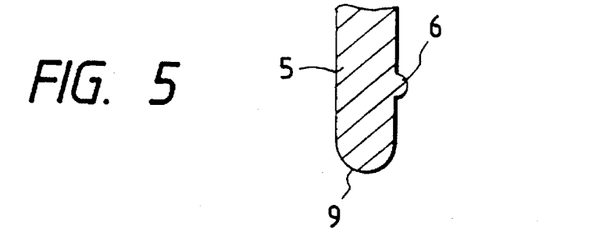
FIG. 5 is an enlarged view of a projection formed on the peripheral wall structure of the case illustrated in FIG. 3.
Figure 7:
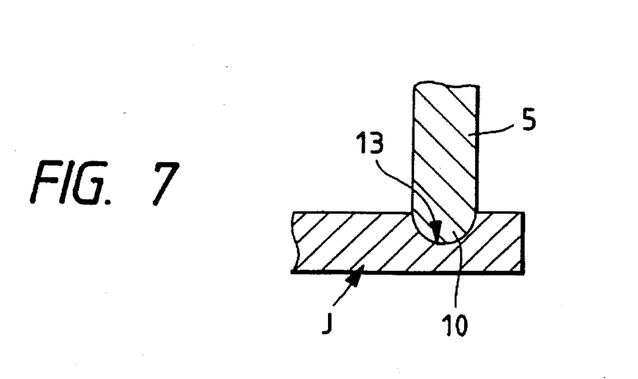
FIG. 7 is an enlarged view illustrating the projection formed at the peripheral wall structure being fit into the groove formed at the connection member of the case illustrated in FIG. 3.

As illustrated in FIGS. 5 and 7, the upper edge 9 and opposite ends 10 of the peripheral wall structure 5 are formed with a projection having a semicircular cross-section shape to be fit into the grooves 12 and 13. Thus, there is provided supplementary fitting means between the internal surface of the connection member J and the bottom surface of the bottom plate 2, the supplementary fitting means being defined by the internal surface of the case and the upper edge 9 and opposite ends 10 of the peripheral wall structure 5.

The engaging means, which keeps the case body B and the closure member C closed relative to each other after the case body B is closed to the closure member C, is composed of engagement ribs 6 formed on the internal surface of the peripheral wall structure 5, extending toward the interior of the closure member, and engagement grooves 11 formed corresponding to the engagement ribs 6 in the vicinity of the grooves 12, which are formed outside the front wall 3a and the side walls 3b of the frame 3.

Figure 6:
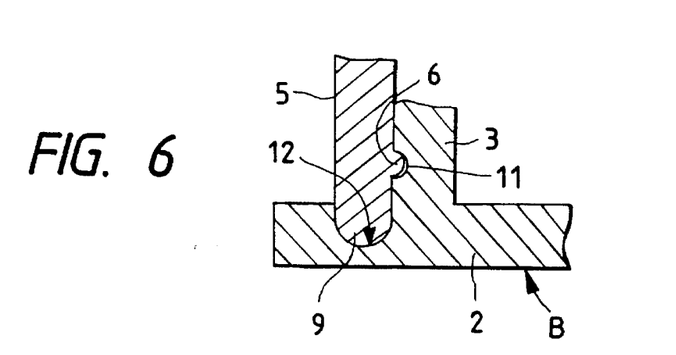
FIG. 6 is an enlarged view illustrating the projection illustrated in FIG. 5 fitting into the groove illustrated in FIG. 4.

Thus, when the case body B and the closure member C are closed relative to each other, the front wall 5a and side walls 5b of the peripheral wall structure 5 overlap the external surfaces of the front wall 3a and side walls 3b of the frame 3. Then, as illustrated in FIG. 6, the upper edge 9 of the peripheral wall structure 5 fits into the groove 12, and the engagement ribs 6 engage the engagement grooves 11. At the same time, the opposite ends 10 of the peripheral wall structure 5 fit into the grooves 13 formed on the connection member J.

As described above, in accordance with the case 1, the upper edge 9 and opposite ends 10 of the peripheral wall structure 5 are supplementarily fit into the internal surface of the case, thereby tightly closing a gap formed between the case body B and the closure member C and which could otherwise act as a path for introducing foreign matter into the case. In particular, dust protection in the vicinity of the connection member J is much enhanced relative to the conventional case 51.

In addition, since the engagement grooves 11 engage the engagement ribs 6 formed in the vicinity of the upper edge 9 of the peripheral wall structure 5, even if the peripheral wall structure 5 has some waviness along its edges produced during molding, the fitting of the closure member to the case body is surely maintained by an engagement force exerted by a combination of the engagement grooves 11 and engagement ribs 6. Thus, the groove 12 does not need to have a particularly great width. In other words, since the upper edge 9 of the peripheral wall structure 5 can be fit into the groove 12 without a gap therebetween, the entry of undesirable foreign matter such as dust is prevented at the fitting section.

Accordingly, when the case body B and the closure member C are closed relative to each other, it is possible to prevent dust from entering the case, thereby surely preventing dust from adhering to the recording medium, such as a magnetic tape.

In addition, dust protection is obtained due to the fact that the peripheral wall structure 5 is supplementarily fit into the internal surface of the case, and hence it is no longer necessary to reduce the gap between the external surface of the frame 3 and the internal surface of the peripheral wall structure 5. Thus, the operation of opening and closing the case can be smoothly carried out for storing and taking out the magnetic tape cassette T.

A method of fabricating the case illustrated in FIG. 1 will now be described in detail hereinbelow.

Figure 12:
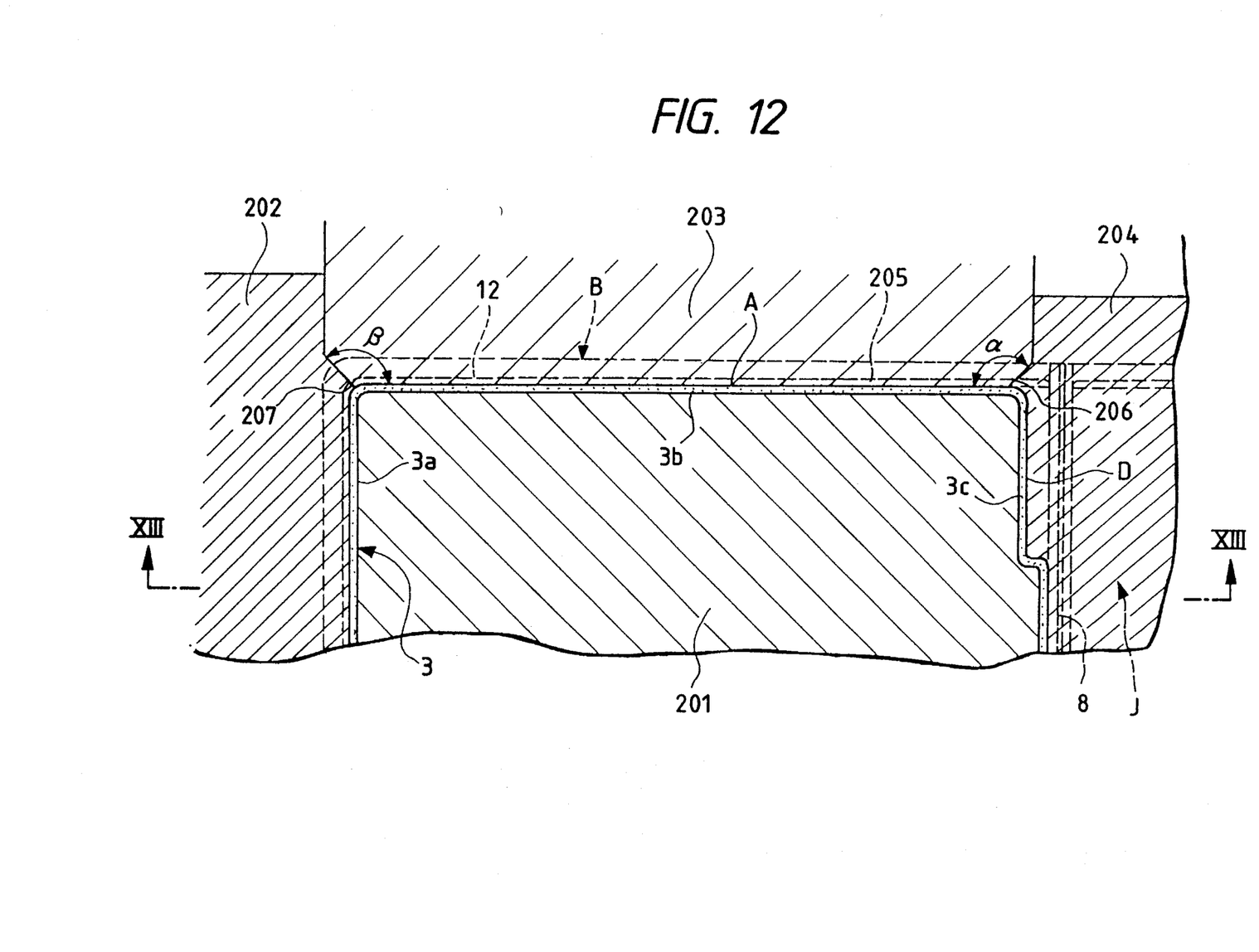
FIG. 12 is a sectional view showing a mold apparatus for molding the case for encasing a video cassette shown in FIG. 3.
Figure 13:
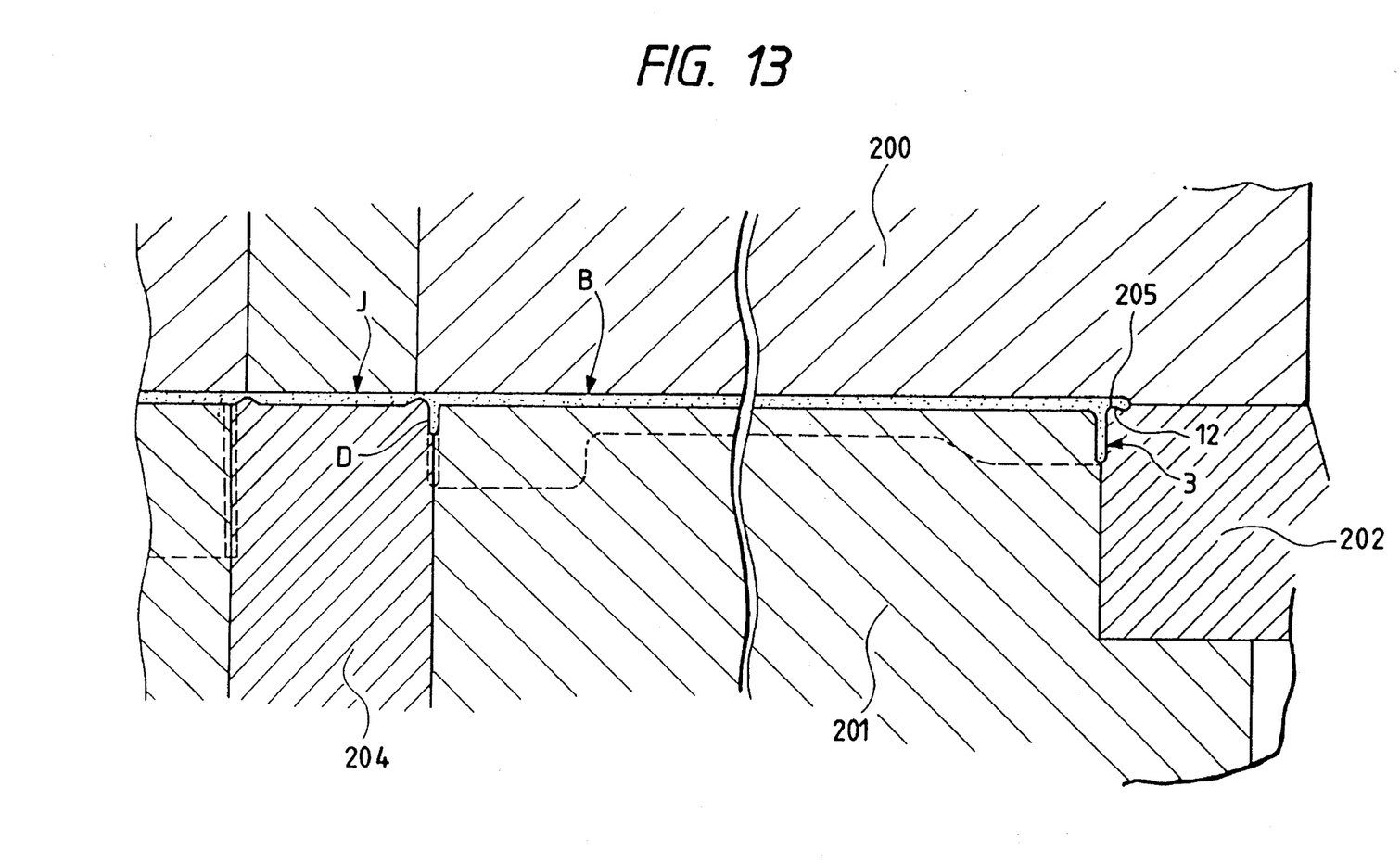
FIG. 13 is a sectional view showing the mold apparatus shown in FIG. 12 taken along line XIII—XIII therein.

The mold for molding a case as illustrated in FIGS. 12 and 13 integrally injection-molds the case illustrated in FIG. 3 for encasing a video cassette therein in accordance with the present invention. The mold comprises a stationary mold 200 and movable molds 201, 204 each arranged at either side of upper and lower surfaces of a bottom wall of the case body B, with slide cores 202, 203 which are disposed outside both the front wall 3a and one of the side walls 3b of the frame 3, respectively, and designed to be backwardly slidable from outer surfaces of the front wall 3a and the one of the side walls 3b, respectively, in a direction perpendicular to the outer surfaces, when the mold is to be open. Though not illustrated in FIG. 12, other slide cores are also disposed symmetrically with respect to position and shape outside the other side wall 3b disposed in facing relation to the above mentioned one of the side walls 3b.

The slide cores 202 and 203, which are slidable on a surface disposed on a mold surface of the movable mold 201, has a projection 205 for forming a groove 12 with the bottom wall of the case body B disposed outside the frame 3. The groove 12 of the case body B structurally serves as an undercut against the slide cores 202 and 203. In a plane at which the slide core 203 is separated from the movable core 204, at least a portion in which the projection 205 is formed, preferably a portion in which a cavity is formed, is tapered, namely inclined in a width-wise direction of the groove 12 to be formed. A mold separating plane of the movable mold 204 disposed adjacent to the slide core 203 is correspondingly shaped.

In the slide cores 203, 203 constituting an outer surface A of the cavity on which are formed the side walls 3b, 3b standing in the vicinity of a side adjacent to a side connected to the connection member J disposed in the frame 3, at least a portion (206a in FIG. 16) in which the projection 205 is formed, preferably a portion (206b in FIG. 16) in which the cavity is formed, which is a portion of an edge 206 of the separation plane being in connection with the movable mold 204 which is a mold constituting an outer surface D of the cavity on which is formed the rear wall 3c standing in the vicinity of the side connected to the connection member J disposed in the frame 3, is inclined in a direction so that the above mentioned portion is disposed closer to the movable mold 204 as it is spaced further away from the outer surface A. Herein, an inclination angle formed between the separation plane and the outer surface A is determined in accordance with a width, a depth, etc. of the groove 12. In general, the angle is determined in the range of 120° to 150°, preferably in the range of 130° to 140°, and the most preferably 135°.

In addition, as illustrated in FIG. 12, also in an edge 207 of the separation plane for separating the slide cores 203, 203 from the slide core 202, a portion in which the projection 205 is formed, preferably a portion in which the cavity is formed, is preferably inclined in a direction so that a point of the portion is disposed closer to the slide core 202 as the point is spaced further away from the outer surface A. In general, the inclination angle β is determined in the range of 120° to 150° preferably in the range of 130° to 140°, and the most preferably 135°.

Hereinbelow is explained a method of injection-molding the case 1 by using the above mentioned mold.

First, resin is filled through a gate (not illustrated) in the cavity defined with the stationary mold 200, the movable mold 201, 204 and the slide cores 202, 203, 203. Then, after the resin has been solidified, the mold is open.

Figure 14:
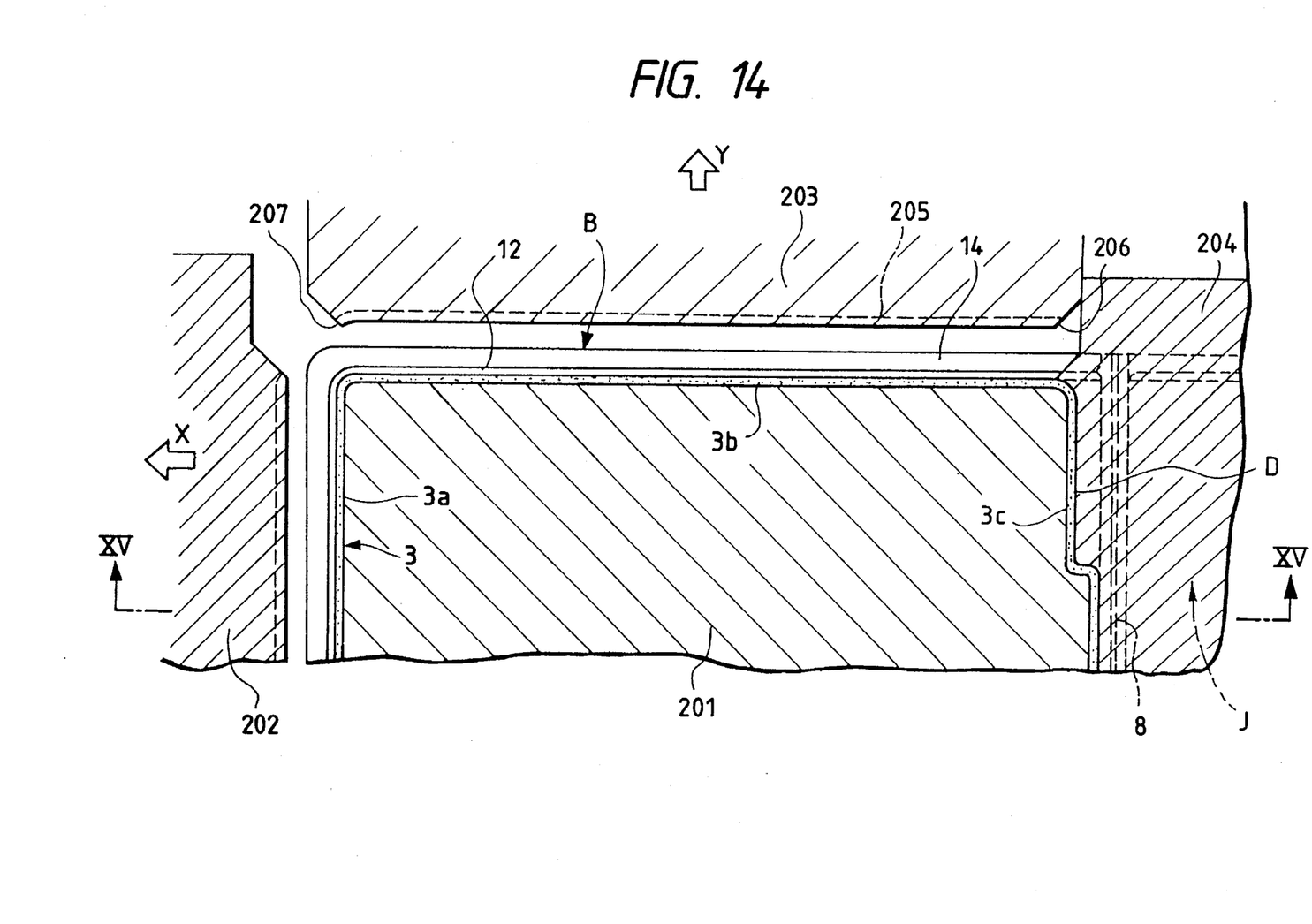
FIG. 14 is a sectional view showing the mold apparatus in which a movable mold moves in a direction indicated with an arrow Z.
Figure 15:
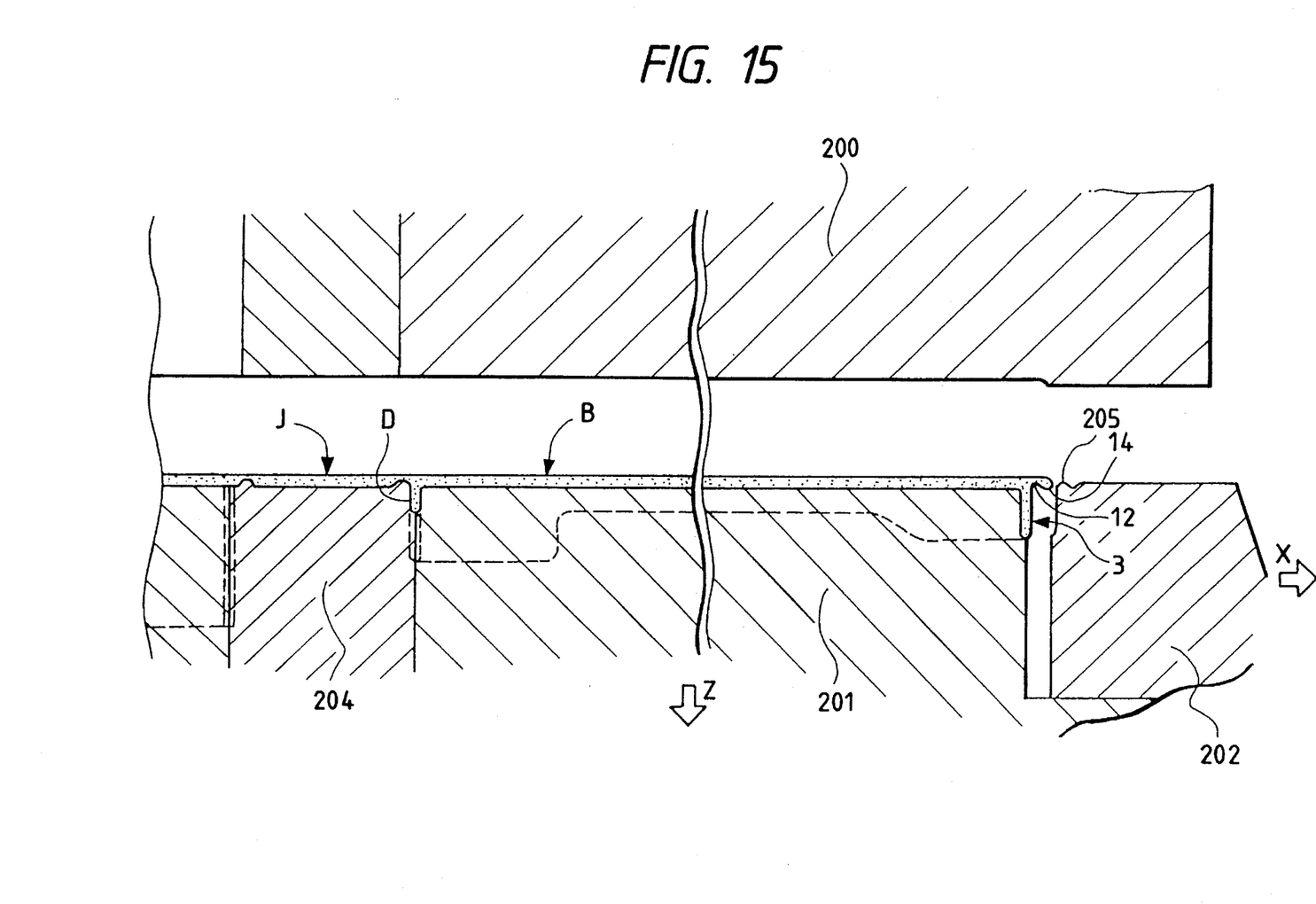
FIG. 15 is a sectional view showing the mold apparatus shown in FIG. 14 taken along line XV—XV therein.

As illustrated in FIGS. 14 and 15, when the movable mold 201 moves in a direction indicated with an arrow Z, a tilt pin (not illustrated) causes the slide cores 202, 203 to move backwardly in directions indicated with arrows X and Y, respectively, at the same time when the mold is open. In the movement of the slide cores 202, 203, the groove 12 of the case body B is forced to disengage from the projections 205 of the slide cores 202, 203.

In the separation plane of the slide core 203 abutting the movable mold 204, at least a portion in which the projection 205 is formed is inclined so that a point of the portion is disposed nearer to the movable mold 204, as the point is spaced further away from the outer surface A. In addition, in this embodiment, in the separation plane of the slide core 203 abutting the slide core 202, at least a portion in which the projection 205 is formed is inclined in a width-wise direction of the projection 205.

Accordingly, when the slide cores 202, 203 are backwardly moved in the X, Y directions and thereby the groove 12 of the case body B is forced to disengage from the projection 205 in order to open the mold, the opposite edges 206 and 207 of the projection 205 are designed to slide along the groove 12 relative to opposite ends 14 of the bottom wall of the case body B.

Figure 16:
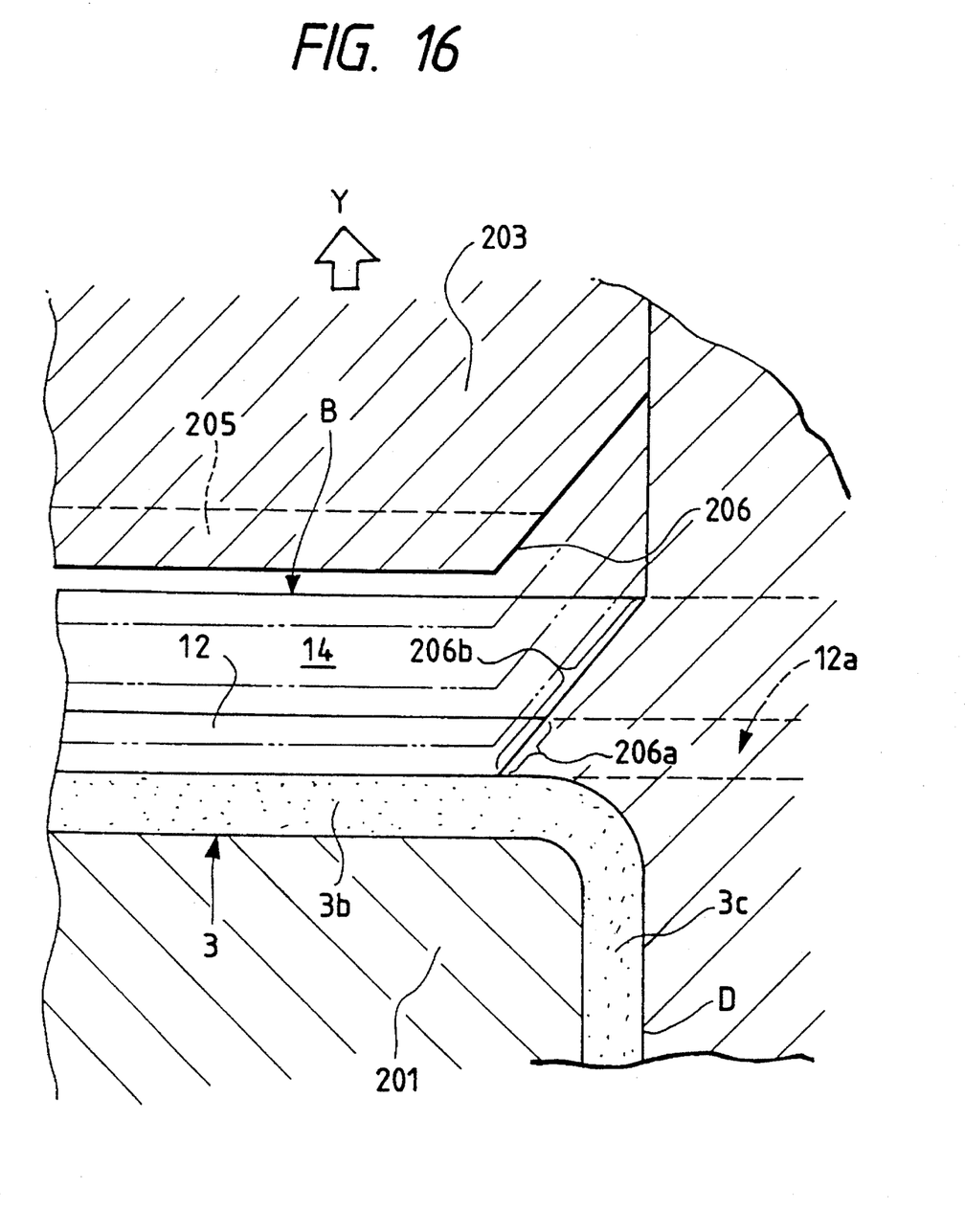
FIG. 16 is an enlarged sectional view showing an essential part of the mold apparatus shown in FIG. 12.

That is, as illustrated in FIG. 16 with an alternate long and two short dashes line, for instance, when the slide core 203 is move backwardly in the Y direction and thereby the opposite ends 14 of the bottom wall of the case body B get over the projection 205, the edge 206 of the projection 205 gradually slides to the left as viewed in FIG. 16 along the groove 12 relative to the opposite ends 14 of the bottom wall of the case body B. Thus, a shearing force caused by the edge 206 of the projection 205 is dispersed against the opposite ends 14 of the case body B, thereby local concentration of the shearing force being prevented.

Figure 8:
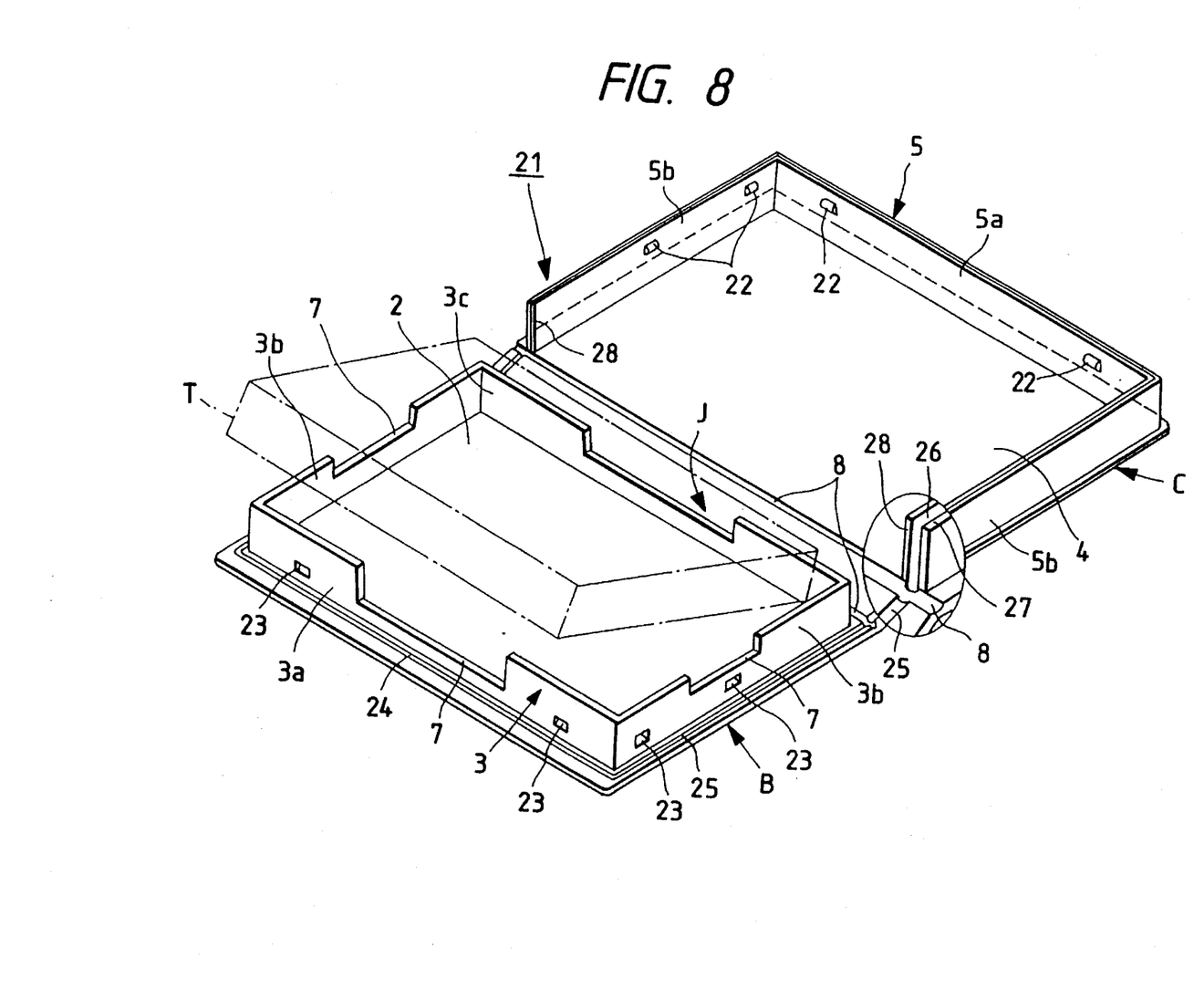
FIG. 8 is a perspective view, including a partially enlarged view, illustrating a case for a recording medium constructed in accordance with another embodiment of the present invention.
Figure 9:
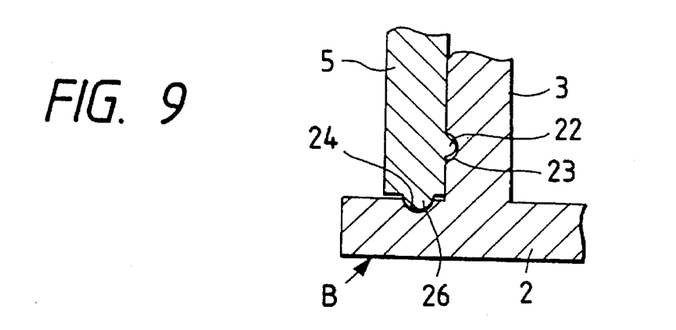
FIG. 9 is an enlarged view illustrating the projection of the case of FIG. 8 fitting into the groove.

FIGS. 8 and 9 are respectively a perspective view, including a partially enlarged view, and a cross-sectional view of the characterized portion illustrating a case 21 for encasing a recording medium therein constructed in accordance with another embodiment of the present invention.

Since the case 21 has substantially the same structure as that of the case 1 of the first-described embodiment in which the case body B and the closure member C are connected to each other through the connection member J so that the case is foldable, the common elements are identified by the same reference numerals as those of the first embodiment, and thus will not be explained in further detail.

Outside the front wall 3a and side walls 3b of the frame 3 and at a location which an upper edge 27 of the peripheral wall structure 5 faces on the bottom surface of the bottom plate 2 is continuously formed a groove 24 having a semicircular cross-section. The groove 24 is spaced from the external surface of the frame 3 by a distance of substantially half the thickness of the peripheral wall structure 5. In addition, as illustrated in FIG. 8, the connection member J is formed at an internal surface thereof to which opposite ends 28 of the peripheral wall structure 5 would face with a groove 25 having a semicircular cross-section.

As illustrated in a partially enlarged section in FIG. 8, the upper edge 27 and opposite ends 28 of the peripheral wall structure 5 are formed with a convex rib 26 having a semicircular cross-section and adapted to be fit into the grooves 24 and 25. Thus, there is provided supplementary fitting means between the internal surface of the connection member J and the bottom surface of the bottom plate 2, composed of an internal surface of the case, and the upper edge 27 and opposite ends 28 of the peripheral wall structure 5.

The engaging means, which keeps the case body B and the closure member C closed relative to each other after the case body B is closed to the closure member C, is composed of engagement projections 22 formed on the internal surface of the peripheral wall structure 5 and extending toward the interior of the closure member, and engagement recesses 23 formed corresponding to the engagement projections 22 in the vicinity of the grooves 24 formed outside the front wall 3a and the side walls 3b of the frame 3.

Thus, when the case body B and the closure member C are closed relative to each other, the front wall 5a and side walls 5b of the peripheral wall structure 5 overlap the external surfaces of the front wall 3a and side walls 3b of the frame 3. Then, as illustrated in FIG. 9, the convex rib 26 formed on the upper edge 27 of the peripheral wall structure 5 fits into the groove 24, and the engagement projections 22 engage the engagement recesses 23. At the same time, the convex rib 26 formed on the opposite ends 28 of the peripheral wall structure 5 fits into the grooves 25 formed on the connection member J.

Thus, the case 21 for encasing a recording medium therein makes it possible to carry out a smooth operation of opening and closing the case for storing and taking out the magnetic tape cassette T, and further surely prevents dust from entering the case, similarly to the case of the first-described embodiment.

In the above-described case 21, the fitting means disposed between the internal surface of the case and the edge of the peripheral wall structure is composed of the grooves 24 and 25, each having a semicircular cross-section, and the convex rib 26. However, the fitting means to be used in the present invention is not limited to the above-mentioned configuration. On the contrary, the fitting means may include various modifications with respect to the cross-section and orientation of the projections and recesses.

Figure 10:
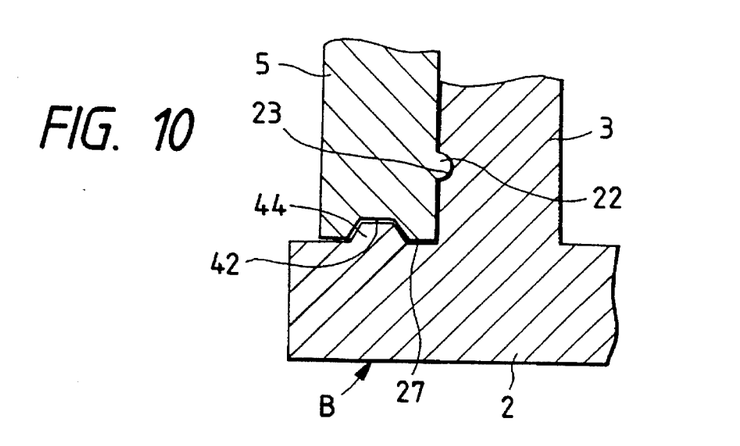
FIG. 10 is an enlarged view illustrating another fitting means to be used in the invention.

For instance, the fitting means illustrated in FIG. 10 is continuously formed outside the frame 3, and further at a location which the upper edge 27 of the peripheral wall structure 5 faces on the bottom surface of the bottom plate 2, with a rib 44 having a trapezoidal cross-section and which is spaced from the external surface of the frame 3 by a distance substantially equal to a half of a thickness of the peripheral wall structure 5. In addition, the peripheral wall structure 5 is formed at the upper edge 27 thereof with a groove 42 having a trapezoidal cross-section to be fit into the rib 44.

Figure 11:
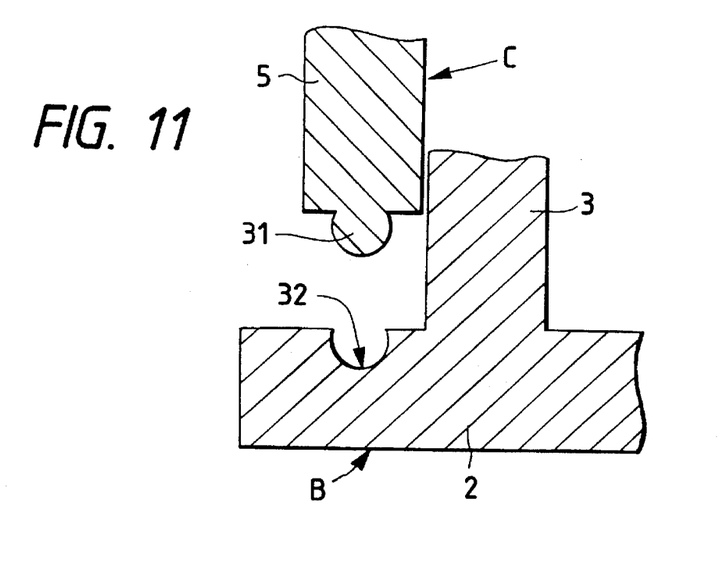
FIG. 11 is an enlarged view illustrating another engaging means to be used in the invention.

FIG. 11 is a partially enlarged view of a case for a recording medium constructed in accordance with still another embodiment of the present invention. The groove having a semicircular cross-section and formed at the bottom surface of the bottom plate 2 outside the frame 3 is formed with a larger diameter portion 32 which has a larger diameter than the width of an opening of the groove. On the other hand, the rib having a semicircular cross-section and formed at the upper edge of the peripheral wall structure 5 is correspondingly formed with a projection 31 to be press-fit into the larger diameter portion 32.

Thus, the engagement means for keeping the case body B and the closure member C closed relative to each other includes the projection 31 and the larger diameter portion 32, both constituting a part of the fitting means, and hence it is not necessary to separately provide the engagement means, and further it is possible to fit the fitting means to each other more firmly.

Although the above-described embodiments relate to cases for a video cassette, the case in accordance with the invention is not limited to such a case. That is, the case in accordance with the invention can be applied to other types of data recording medium.

As described above, the case in accordance with the invention includes the fitting means, formed at the upper edge of the peripheral wall structure formed on the closure member, for providing supplementary fitting between the internal surface of the case and the upper edge, and the engagement means, disposed in the vicinity of the fitting means, for keeping the case body and the closure member closed relative to each other, whereby the upper edge of the peripheral wall structure is fit to the internal surface of the case in a supplementary fashion when the case is closed.

Thus, it is possible to surely prevent foreign matter such as dust from entering the case, and it is also possible to construct the case so that the internal surface of the peripheral wall structure overlaps the external surface of the frame with an appropriate gap being produced therebetween, thereby providing a smooth operation for opening and closing the case.

In addition, since the engaging means engages the peripheral wall structure on which the fitting means is formed in the vicinity of the distal edge thereof, even if the peripheral wall structure has some waviness along the edges produced during molding, the fitting of the closure member to the case body is surely maintained by an engagement force exerted by the engaging means.

Furthermore, the case can be simplified in structure when the engagement means is provided by forming at least a part of the fitting means into a press-fit section.

What is claimed is:

1. A case for encasing a recording medium therein, said case comprising a case body connected with a closure member through a connection member and a thin hinge so that said case body and said closure member are operative to open and close relative to each other, said case body being formed on a bottom surface thereof with a frame defining a space in which a cassette is to be stored, said closure member being formed on an upper surface thereof with a peripheral wall structure which overlaps said frame at an external surface of said frame when said case is closed, said case being characterized by: supplementary fitting means disposed between an edge of said peripheral wall structure and an internal surface of said case facing said edge of said peripheral wall structure, said supplementary fitting means comprising a continuously formed first groove having a semicircular cross-section disposed outside a front wall and side walls of said frame and at a location which faces an upper edge of said peripheral wall structure on said bottom surface of said case body, said first groove being formed in said bottom surface along the external surfaces of said front wall and said side walls, thereby to prevent entrance of dust into said case when said case is closed; and engaging means, disposed in the vicinity of said fitting means, for engaging said case body to said closure member so that said case body is kept closed relative to said closure member.

2. The case for encasing a recording medium therein as recited in claim 1, wherein said engaging means is constructed by forming at least a part of said fitting means as a press-fitting section.

3. The case for encasing a recording medium therein as recited in claim 1, wherein said frame of said case body is rectangular, and said peripheral wall structure of said closure member is U-shaped.

4. The case for encasing a recording medium therein as recited in claim 1, wherein said supplementary fitting means further comprises a second groove having a semicircular cross-section formed on said connection member at the internal surface of said connection member and to which opposite ends of said peripheral wall structure face.

5. The case for encasing a recording medium therein as recited in claim 4, wherein said upper edge and said opposite ends of said peripheral wall structure are formed with a projection having a semicircular cross-section shape to be fit into said first and second grooves.

6. The case for encasing a recording medium therein as recited in claim 1, wherein said engaging means is composed of engagement projections formed on the internal surface of said peripheral wall structure and extending toward the interior of the closure member, and engagement recesses formed corresponding to said engagement projections in the vicinity of said first groove.

7. A case for encasing a recording medium therein, said case comprising a case body connected with a closure member through a connection member and thin hinge so that said case body and said closure member are operative to open and close relative to each other, said case body being formed on a bottom surface thereof with a frame defining a space in which a cassette is to be stored, said closure member being formed on an upper surface thereof with a peripheral wall structure which overlaps said frame at an external surface of said frame when said case is closed, said case being characterized by: supplementary fitting means disposed between an edge of said peripheral wall structure and an internal surface of said case facing said edge of said peripheral wall structure; and engaging means, disposed in the vicinity of said fitting meads, for engaging said case body to said closure member so that said case body is kept closed relative to said closure member, wherein said supplementary fitting means comprises:

a first groove continuously formed outside a front wall and side walls of said frame and at a location which an upper edge of said peripheral wall structure faces on said bottom surface of the case body;

a second groove formed in said connection member at an internal surface of said connection member and to which opposite ends of said peripheral wall structure face; and a convex rib having a semicircular cross-section formed at an upper edge and opposite ends of said peripheral wall structure, said convex rib is operative to fit into said first and second grooves.

8. The case for encasing a recording medium therein as recited in claim 7, wherein said engaging means is composed of engagement projections formed on the internal surface of said peripheral wall structure and extending toward the interior of the closure member, and engagement recesses formed corresponding to said engagement projections in the vicinity of said first grooves.

9. The case for encasing a recording medium therein as recited in claim 8, wherein when the case body and said closure member are closed relative to each other, said front wall and said side walls of said peripheral wall structure overlap the external surfaces of said front wall and said side walls of said frame, and said convex rib fits into said first groove, and said engagement projections engage engagement recesses at the same time said convex rib fits into said second groove formed on said connection member.

* * * * *